(12) United States Patent
Tsukamoto

(10) Patent No.: US 6,310,729 B1
(45) Date of Patent: Oct. 30, 2001

(54) DICHROIC MIRROR

(75) Inventor: Seitoku Tsukamoto, deceased, late of Yokohama (JP), by Mayumi Tsukamoto, legal representative

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/448,476

(22) Filed: Nov. 24, 1999

(30) Foreign Application Priority Data

Dec. 2, 1998 (JP) .................................................. 10-358428

(51) Int. Cl.⁷ ............................. G02B 27/14; G02B 1/10; G02B 5/08
(52) U.S. Cl. ........................... 359/634; 359/583; 359/839
(58) Field of Search ..................................... 359/634, 636, 359/638, 583, 839, 589, 585, 588; 353/20

(56) References Cited

U.S. PATENT DOCUMENTS

| | | | |
|---|---|---|---|
| 5,453,859 | * | 9/1995 | Sannohe et al. ........................ 359/63 |
| 5,661,596 | * | 8/1997 | Biro et al. .............................. 359/359 |
| 5,768,026 | * | 6/1998 | Kiyomoto ............................. 359/634 |
| 5,914,817 | * | 6/1999 | Browning et al. ..................... 359/634 |
| 6,014,255 | * | 1/2000 | Van Der Wal et al. .............. 359/487 |
| 6,018,421 | * | 1/2000 | Cushing ................................ 359/589 |
| 6,064,525 | * | 5/2000 | Depauw ................................ 359/583 |

* cited by examiner

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

A dichroic mirror comprises a transparent substrate, a dielectric multilayer structure formed thereon. The dielectric multilayer structure includes a main multilayer structure comprised of high refractive index layers and low refractive index layers formed alternately, each layer having an optical thickness of $\lambda/4$ where $\lambda$ is the designed central wavelength, a first transmittance regulating film provided between the main multilayer structure and the transparent substrate, and a second transmittance regulating film provided on the other side of the main multilayer structure. The first and second transmittance regulating films typically have a three- or four-layer structure of intermediate refractive index layers and low refractive index layers formed alternately. The intermediate refractive index layers have a refractive index lower than but close to that of the high refractive index layers.

6 Claims, 2 Drawing Sheets

DICHROIC MIRROR

BACKGROUND OF THE INVENTION

1. Field of the Invention

This invention relates to a dichroic mirror to be suitably used for an optical apparatus or an optical telecommunication apparatus such as a camera, a copying machine or an optical printing machine.

2. Related Background Art

Conventional optical systems of optical apparatuses and optical telecommunication apparatuses typically include a dichroic mirror that reflects light in a specific waveband and transmits light in a different waveband. Such a dichroic mirror comprises a dielectric multilayer film obtained by alternately laying high refractive index films and low refractive index films, each having an optical thickness (refractive index n×film thickness d) of $\lambda/4$, where $\lambda$ is the designed central wavelength.

Conventional dichroic mirrors normally comprise a relatively large number of component layers for the dielectric multilayer film to increase the reflectivity in the reflection waveband. However, as the number of layers increases, the ripple generated in the transmission waveband (fluctuation of transmission loss generated due to transmittance varying depending on wavelength) increases its influence to reduce the transmittance in the transmission waveband. FIG. 1 shows a graph typically illustrating the spectral transmittance characteristics of a known dichroic mirror. It will be appreciated from FIG. 1 that the transmittance is reduced in the transmission waveband by the ripples generated in that band. In FIG. 1, the horizontal axis represents the wavelength and the vertical axis represents the transmittance (%).

SUMMARY OF THE INVENTION

Therefore, it is an object of the present invention to provide a dichroic mirror that is free from the above problem of the prior art and shows excellent optical characteristics including a high reflectivity in the reflection waveband and a flat and high transmittance with suppressed ripples.

Therefore, according to the invention, the above object is achieved by providing a dichroic mirror comprising:

a transparent substrate;

a dielectric multilayer film formed on the transparent substrate by alternately laying high refractive index layers, each having an optical thickness of $\lambda/4$, $\lambda$ being the designed central wavelength, and low refractive index layers, each having a refractive index lower than that of the high refractive index layers;

a first transmittance regulating film formed between the dielectric multilayer film and the transparent substrate; and a second transmittance regulating film formed on the dielectric multilayer film at the side opposite to the transparent substrate;

the first and second transmittance regulating films being formed by alternately laying intermediate refractive index layers and low refractive index layers, the intermediate refractive index layers having a refractive index lower than that of the high refractive index layers and higher than the median of the refractive index of the high refractive index layers and that of the low refractive index layers.

DESCRIPTION OF THE PREFERRED EMBODIMENTS

Now, the present invention will be described by referring to the accompanying drawings that illustrate preferred embodiments of the invention.

Figure 2:
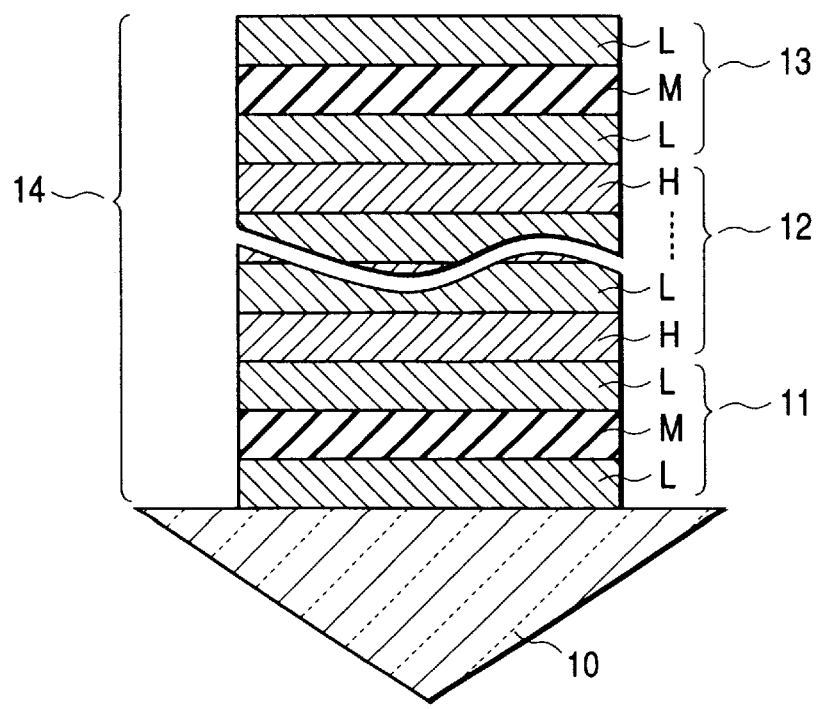
FIG. 2 is a schematic cross sectional view of a dichroic mirror according to the invention, showing the configuration of its film layers.

FIG. 2 is a schematic cross sectional view of a dichroic mirror according to the invention, showing the configuration of its film layers.

A dichroic mirror according to the invention comprises an optical glass substrate 10 which may be a BK7 optical glass prism and a dielectric multilayer film 14 formed on the surface of the substrate by laying a plurality of dielectric layers, each having an optical thickness of $\lambda/4$, $\lambda$ being the designed central wavelength, that show respective refractive indexes different from each other. More specifically, the dielectric multilayer film 14 includes a multilayer film 12 formed by alternately laying high refractive index layers H and low refractive index layers L, a first transmittance regulating film 11 formed between the multilayer film 12 and the substrate 10 and a second transmittance regulating film 13 formed on the multilayer film 12 at the side opposite to the substrate 10.

Each of the first and second transmittance regulating films 11 and 13 is formed by alternately laying intermediate refractive index layers M and low refractive index layers L. The intermediate refractive index layers M have a refractive index lower than, but close to, that of the high refractive index layers H. In other words, the intermediate refractive index layers have a refractive index lower than that of the high refractive index layers and higher than the median of the refractive index of the high refractive index layers and that of the low refractive index layers. Each of the transmittance regulating films 11 and 13 may have a three-layer structure realized by alternately laying an intermediate refractive index layer and two low refractive index layers or a four-layer structure realized by alternately laying two intermediate refractive index layers and two low refractive index layers.

Dielectric materials that can be used for the intermediate refractive index layers M of the transmittance regulating films 11 and 13 include titanium oxide ($TiO_2$), zirconium oxide ($ZrO_2$), tantalum oxide ($Ta_2O_5$), niobium oxide ($Nb_2O_5$) and a mixture of any of them, although these materials may also be used for the high refractive index layers H. The refractive index of the intermediate refractive index layers M is lower than, but close to, that of the high refractive index layers H. Preferably, the refractive index of the intermediate refractive index layers M is found within a range of 85 to 95% of that of the high refractive index layers H. Dielectric materials that can be used for the low refractive index layers L include aluminum oxide ($Al_2O_3$), silicon oxide ($SiO_2$) and a mixture thereof.

The dichroic mirror illustrated in FIG. 2 is realized by sequentially laying a transmittance regulating film 11 having a three-layer structure of a low refractive index layer L of $Al_2O_3$, an intermediate refractive index layer M of $Ta_2O_5$ and another low refractive index layer L of $Al_2O_3$, then a multilayer film 12 of thirteen layers including high refractive index layers H containing $TiO_2$ as a principal ingredient and low refractive index layers L of $Al_2O_3$ that are arranged alternately, and another transmittance regulating film 13 also having a three-layer structure of a low refractive index layer L of $Al_2O_3$, an intermediate refractive index layer M of $Ta_2O_5$ and another low refractive index layer L of $Al_2O_3$ on the surface of an optical glass substrate 10 which is a BK7 optical glass prism.

By arranging transmittance regulating films 11 and 13, each having a three-layer or four-layer structure of intermediate refractive index layers M and low refractive index layers L that are laid alternately, respectively on the substrate side and on the final layer side of the multilayer film 12 on the optical substrate 10 in a manner as described below, the cyclicity that can appear due to the multilayer film structure of a central portion of the dichroic mirror involved is disturbed by the difference of refractive index between the high refractive index layers and the intermediate refractive index layers and their optical film thicknesses. Consequently, it is possible to control the ripple of the transmission waveband. Thus, according to the invention, there is provided a dichroic mirror that shows excellent optical characteristics including a high reflectivity in the reflection waveband and a flat and high transmittance with suppressed ripples in the transmission waveband.

Now, the present invention will be described by way of examples, although the present invention is by no means limited thereto.

EXAMPLE 1

A BK7 optical glass prism was placed in a vacuum evaporation system and heated until the surface temperature of the prism was raised to about 300° C. Then, the inside of the system was evacuated to a vacuum level of less than $1 \times 10^{-3}$Pa. Thereafter, a low refractive index $Al_2O_3$ film, an intermediate refractive index $Ta_2O_5$ film and another low refractive index $Al_2O_3$ film were formed to respective thicknesses of 250 nm, 100 nm and 100 nm to produce a three-layer transmittance regulating film.

Then, high refractive index $TiO_2$ films containing $TiO_2$ as a principal ingredient, each having a film thickness of 150 nm, and low refractive index $Al_2O_3$ films, each having a film thickness of 105 nm, are arranged alternately thereon to produce a multilayer film having a total of fifteen layers.

Then, a low refractive index $Al_2O_3$ film, an intermediate refractive index $Ta_2O_5$ film and another low refractive index $Al_2O_3$ film were formed thereon to respective thicknesses of 100 nm, 100 nm and 250 nm to produce another three-layer transmittance regulating film.

Thus, a total of twenty-one layers were formed for the dichroic mirror, which was then taken out from the vacuum evaporation system and bonded to another prism.

Figure 3:
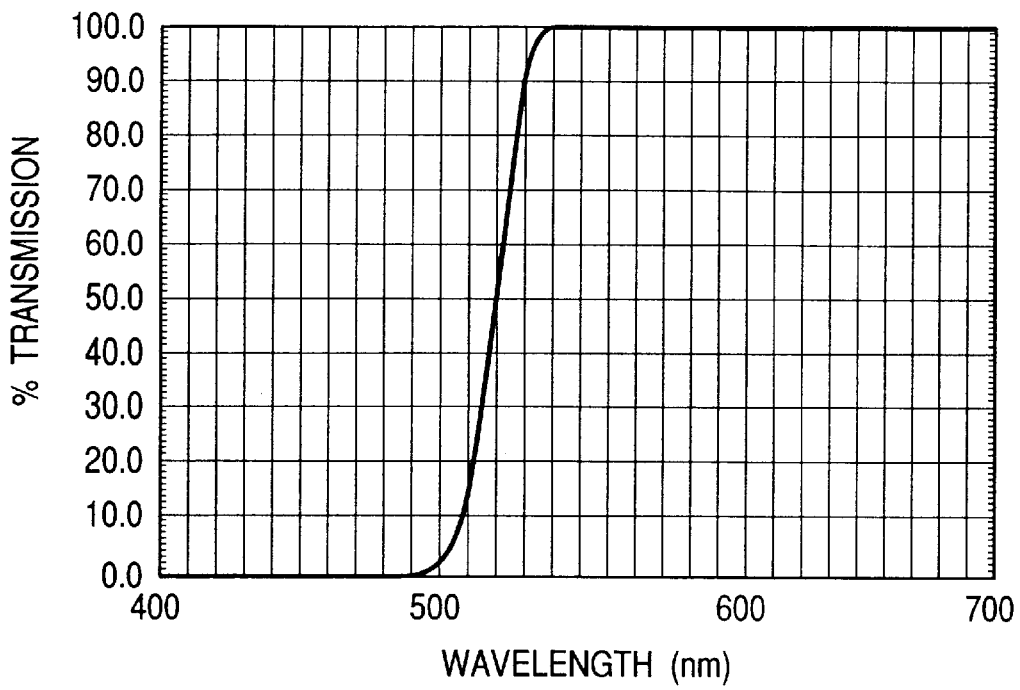
FIG. 3 is a graph showing the spectral transmittance characteristics of a dichroic mirror according to the invention and prepared in Example 1 below.

FIG. 3 is a graph showing the spectral transmittance of the S-polarization component of incident light striking the dichroic mirror with an angle of 45°. As seen from FIG. 3, the dichroic mirror of this example reflects blue light with a wavelength of 450 nm and provides very flat spectral transmittance characteristics giving 100% transmission of green light with a wavelength of 550 nm and red light with a wavelength of 650 nm without showing any ripple.

EXAMPLE 2

A BK7 optical glass prism was placed in a vacuum evaporation system and heated until the surface temperature of the prism was raised to about 300° C. Then, the inside of the system was evacuated to a vacuum level of less than $1 \times 10^{-3}$Pa. Thereafter, a low refractive index $Al_2O_3$ film, an intermediate refractive index $Ta_2O_5$ film, another low refractive index $Al_2O_3$ film and another intermediate refractive index $Ta_2O_5$ film were formed to respective thicknesses of 110 nm, 250 nm, 200 nm and 250 nm to produce a four-layer transmittance regulating film.

Then, low refractive index $Al_2O_3$ films, each having a film thickness of 160nm, and high refractive index $TiO_2$ films containing $TiO_2$ as a principal ingredient, each having a film thickness of 240 nm, are arranged alternately thereon to produce a multilayer film having a total of thirteen layers.

Then, an intermediate refractive index $Ta_2O_5$ film, a low refractive index $Al_2O_3$ film, another intermediate refractive index $Ta_2O_5$ film and another low refractive index $Al_2O_3$ film were formed thereon to respective thicknesses of 250 nm, 200 nm, 250 nm and 110 nm to produce another four-layer transmittance regulating film.

Thus, a total of twenty-one layers were formed for the dichroic mirror, which was then taken out from the vacuum evaporation system and bonded to another prism.

Figure 4:
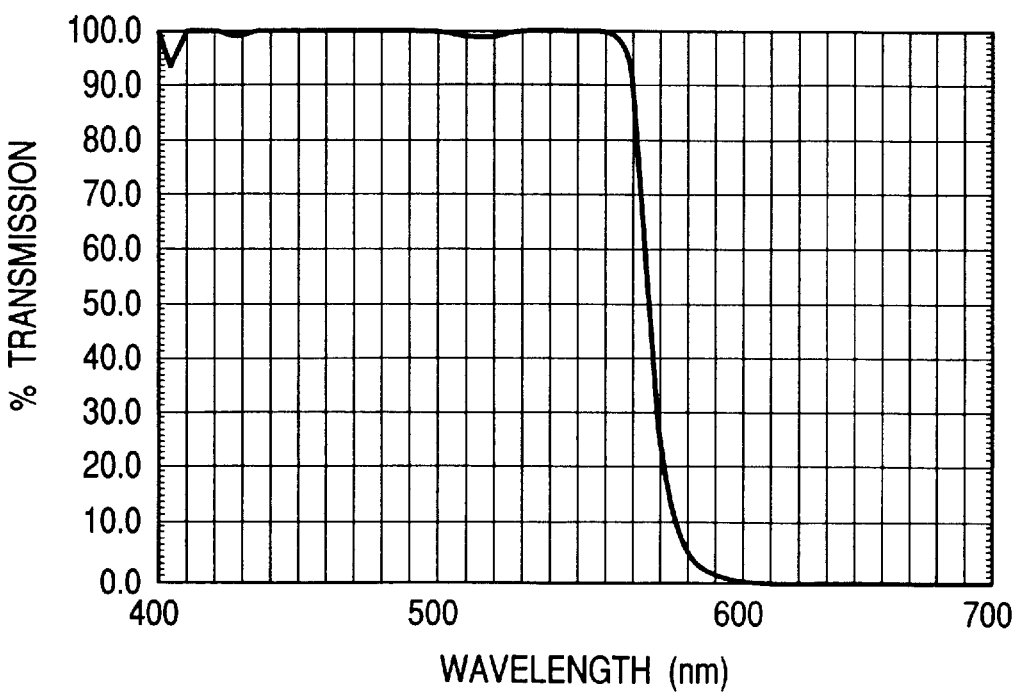
FIG. 4 is a graph showing the spectral transmittance characteristics of a dichroic mirror according to the invention and prepared in Example 2 below.

FIG. 4 is a graph showing the spectral transmittance of the S-polarization component of incident light striking the dichroic mirror with an angle of 45°. As seen from FIG. 4, the dichroic mirror of this example reflects red light with a wavelength of 650 nm and provides very flat spectral transmittance characteristics giving 100% transmission of blue light with a wavelength of 450 nm and green light with a wavelength of 550 nm without showing any ripple.

EXAMPLE 3

A BK7 optical glass prism was placed in a vacuum evaporation system and heated until the surface temperature of the prism was raised to about 300° C. Then, the inside of the system was evacuated to a vacuum level of less than $1 \times 10^{-3}$Pa. Thereafter, a low refractive index $Al_2O_3$ film, an intermediate refractive index $ZrO_2$ film and another low refractive index $Al_2O_3$ film were formed to respective thicknesses of 250 nm, 100 nm and 100 nm to produce a three-layer transmittance regulating film.

Then, high refractive index $TiO_2$ films containing $TiO_2$ as a principal ingredient, each having a film thickness of 150 nm, and low refractive index $Al_2O_3$ films, each having a film thickness of 105 nm, are arranged alternately thereon to produce a multilayer film having a total of fifteen layers.

Then, a low refractive index $Al_2O_3$ film, an intermediate refractive index $ZrO_2$ film and another low refractive index $Al_2O_3$ film were formed thereon to respective thicknesses of 100 nm, 100nm and 250 nm to produce another three-layer transmittance regulating film.

Thus, a total of twenty-one layers were formed for the dichroic mirror, which was then taken out from the vacuum evaporation system and bonded to another prism.

The dichroic mirror of this example reflects blue light with a wavelength of 450 nm and provides very flat spectral transmittance characteristics giving 100% transmission of green light with a wavelength of 550 nm and red light with a wavelength of 650 nm without showing any ripple as in the case of FIG. 3 shown for the first example.

COMPARATIVE EXAMPLE

A BK7 optical glass prism was placed in a vacuum evaporation system and heated until the surface temperature of the prism was raised to about 300° C. Then, the inside of the system was evacuated to a vacuum level of less than $1\times10^{-3}$ Pa. Thereafter, a low refractive index $Al_2O_3$ film, a high refractive index $TiO_2$ film containing $TiO_2$ as a principal ingredient and another low refractive index $Al_2O_3$ film were formed to respective thicknesses of 110 nm, 70 nm and 105 nm. Then, high refractive index $TiO_2$ films containing $TiO_2$ as a principal ingredient, each having a film thickness of 105 nm, and low refractive index $Al_2O_3$ films, each having a film thickness of 105 nm, are arranged alternately thereon to produce a multilayer film having a total of fifteen layers. Then, a low refractive index $Al_2O_3$ film, a high refractive index $TiO_2$ film containing $TiO_2$ as a principal ingredient and another low refractive index $Al_2O_3$ film were formed thereon to respective thicknesses of 105 nm, 70 nm and 110 nm. Thus, a total of twenty-one layers were formed for the dichroic mirror, which was then taken out from the vacuum evaporation system and bonded to another prism.

Figure 1:
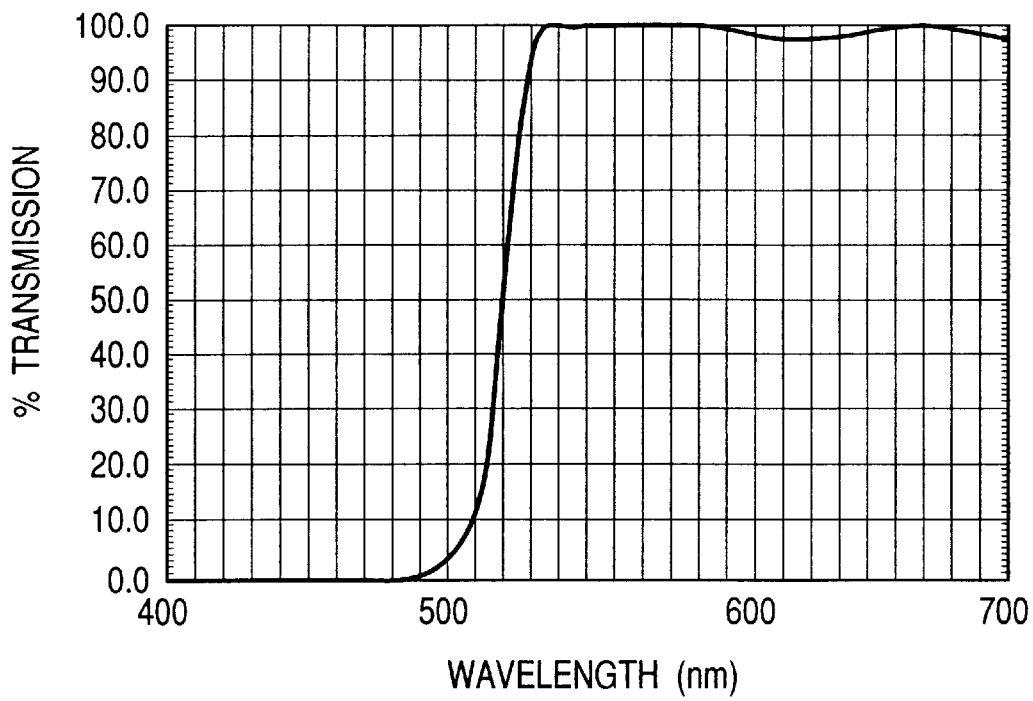
FIG. 1 is a graph typically illustrating the spectral transmittance characteristics of a conventional dichroic mirror.

FIG. 1, described above, is a graph showing the spectral transmittance of the S-polarization component of incident light striking the dichroic mirror of this comparative example with an angle of 45°. As seen from FIG. 1, the dichroic mirror reflects blue light with a wavelength of 450 nm and suppresses the ripple of green light with a wavelength of 550 nm, but it shows a ripple of about 3% for red light with a wavelength of 650 nm to thereby provide spectral transmittance characteristics with a reduced transmittance.

Thus, it will be clear by comparing the above-described examples and the comparative example, that the dichroic mirror prepared in any of the above examples by arranging transmittance regulating films, each having a structure of intermediate refractive index layers and low refractive index layers that are laid alternately, respectively on the substrate side and on the final layer side of the dielectric multilayer film on an optical substrate in a manner as described above, shows excellent optical characteristics including a high reflectivity in the reflection waveband and a flat and high transmittance with suppressed ripples.

What is claimed is:

1. A dichroic mirror comprising:
   a transparent substrate;
   a dielectric multilayer film formed on said transparent substrate by alternately laying high refractive index layers, each having an optical thickness of $\lambda/48$, $\lambda$ being the designed central wavelength, and low refractive index layers, each having a refractive index lower than that of the high refractive index layers;
   a first transmittance regulating film formed between said dielectric multilayer film and said transparent substrate; and
   a second transmittance regulating film formed on said dielectric multilayer film at the side opposite to said transparent substrate,
   wherein said first and second transmittance regulating films are formed by alternately laying intermediate refractive index layers and low refractive index layers, said intermediate refractive index layers having a refractive index lower than that of said high refractive index layers and higher than the median of the refractive index of said high refractive index layers and that of said low refractive index layers.

2. A dichroic mirror according to claim 1, wherein
   each of said first and second transmittance regulating films is formed by alternately laying an intermediate refractive index layer and two low refractive index layers.

3. A dichroic mirror according to claim 1, wherein
   each of said first and second transmittance regulating films is formed by alternately laying two intermediate refractive index layers and two low refractive index layers.

4. A dichroic mirror according to claim 1, wherein
   said intermediate refractive index layers have a refractive index found within a range of 85 to 95% of that of the high refractive index layers.

5. A dichroic mirror according to any of claims 1 through 4, wherein said high refractive index layers are made of $TiO_2$ and said intermediate refractive index layers are made of $ZrO_2$ or $Ta_2O_5$.

6. A dichroic mirror according to claim 5, wherein said low refractive index layers are made of $Al_2O_3$.

* * * * *

UNITED STATES PATENT AND TRADEMARK OFFICE
CERTIFICATE OF CORRECTION

PATENT NO. : 6,310,729 B1
DATED : October 30, 2001
INVENTOR(S) : Seitoku Tsukamoto It is certified that error appears in the above-identified patent and that said Letters Patent is hereby corrected as shown below:

Column 2,
Line 1, "cross sectional" should read -- cross-sectional --.
Line 17, "cross sectional" should read -- cross-sectional --.

Column 6,
Line 3, "$\lambda/48$," should read -- $\lambda 4$, --.

Signed and Sealed this

Thirteenth Day of August, 2002

Attest:

Attesting Officer

JAMES E. ROGAN
Director of the United States Patent and Trademark Office